United States Patent [19]

Tan

[11] Patent Number: 5,410,465
[45] Date of Patent: Apr. 25, 1995

[54] INTEGRATED CIRCUIT CHARGE PUMP VOLTAGE LEVEL CONVERTER

[76] Inventor: Charles M. C. Tan, 21 Del Prado Ave., Campbell, Calif. 95008

[21] Appl. No.: 76,067

[22] Filed: Jun. 11, 1993

[51] Int. Cl.⁶ .............................................. H02M 3/18
[52] U.S. Cl. .................................................... 363/60
[58] Field of Search ..................... 363/59, 60; 323/315; 307/297

[56] References Cited

U.S. PATENT DOCUMENTS 4,344,121  8/1982  Weber ................................ 363/60 X
4,621,315  11/1986  Vaughn et al. ........................ 363/60
4,752,699  6/1988  Cranford, Jr. et al. ........... 363/60 X Primary Examiner—Steven L. Stephan
Assistant Examiner—E. To

[57] ABSTRACT

An on-chip voltage conversion circuit arrangement including charge pump logic circuitry, a dual-phase clock pulse circuit, and a comparator circuit. The dual-phase clock pulse circuit produces charge and pump pulses to drive the charge pump logic circuit while it is supplied with an input voltage level for conversion to a desired output voltage level. The charge pump logic circuit includes an output capacitor for producing the desired voltage level in a semiconductor chip to be fabricated. The output capacitor is supplied with electric charge during alternating charge and pump cycles from one or two charging capacitors. The output voltage is compared with a voltage reference permit enablement and disablement of charging and discharging action by the capacitors.

8 Claims, 5 Drawing Sheets

INTEGRATED CIRCUIT CHARGE PUMP VOLTAGE LEVEL CONVERTER

TECHNICAL FIELD

The field of this invention is directed toward on-chip voltage conversion methods and arrangements, and more particularly toward on-chip voltage conversion techniques and arrangements including on-chip capacitor systems conducting cooperative alternating charge and pump activities.

BACKGROUND

Semiconductor chip power is typically supplied on-chip at a single, predetermined voltage level. Chip designers typically specify, a single, predetermined voltage level for reasons of standardization and convenience. Accordingly, as chip standards migrate from one on-chip voltage level to another, difficulties arise during transition periods. During such times of transition, new chips designed to operate at voltage levels according to the new standard voltage level may desirably be mounted on circuit boards and be incorporated into electronic systems designed to operate at the former standard voltage level.

Unfortunately, semiconductor chips designed to the new standard voltage will not generally make provision to accommodate the voltage level previously widely recognized and followed. It is typically presumed that either the entire electronics system into which the new chip design is to be incorporated will operate at the new voltage level, or that some off-chip solution will be provided to create voltage compatibility between subsystems and chips operating at separate voltage level.

Additionally, in the general case, a chip which operates at a given voltage level is not able to recognize that it has been provided with a nonstandard voltage level. There has been a failure of semiconductor chip designers to provide an on-chip solution for power provided at an arbitrary voltage level to be automatically converted to a desired internal operating voltage level. This creates serious compatibility problems for the semiconductor industry during a period of accelerating miniaturization.

This increased miniaturization of chip geometries in the semiconductor industry makes it increasingly necessary to develop new solutions and chip designs which can accommodate a plurality of on-chip voltage levels. One aspect of the trend toward miniaturization is the use of increasingly thin gate oxide layers for CMOS devices fabricated in the industry. This has resulted in an increased recent motivation and an urgent need for semiconductor circuits to be able to accommodate both 5.0 volt and 3.3 volt on-chip voltage levels. It is anticipated that in the near future even lower on-chip voltage levels, such as for example 2.2 volts and 1.1 visits are likely to develop into the required circuit design norm.

It is accordingly an object of the invention herein to provide an on-chip voltage conversion solution for semiconductor chips manufactured during technology transition periods in which the semiconductor industry worldwide converts from one standard internal semiconductor chip voltage level to another.

It is an object of the invention herein to develop semiconductor circuit chips which are operable at a plurality of internal semiconductor chip voltage levels.

It is yet another object of the invention herein to provide an on-chip semiconductor design approach which converts internal voltage levels from a standard 5.0 voltage level to 3.3 volts.

SUMMARY OF THE INVENTION

An on-chip voltage conversion circuit according to the invention herein provides alternating clock pulses at mutually exclusive charge and pump phases. The alternating clock pulses provided drive an electric charge pump logic circuit operating with electric power at a first input voltage level. The electric charge pump logic circuit is effective for establishing a second, desired voltage level needed for semiconductor chip operation. The on-chip voltage conversion circuit according to the invention particularly includes clock circuitry effective for producing complementary charge and pump pulses which alternate to ensure that when one of the pulses, i.e., either a charge pulse or a pump pulse, is "on," the other pulse, i.e., either the complementary pump pulse or the complementary charge pulse, will be in an "off" state.

The on-chip voltage conversion circuit includes an output capacitor effective for producing an output voltage level at a predetermined standard level required for semiconductor chip operation. This output voltage level is compared with a selected reference voltage by a comparator circuit according to the invention herein. The comparator circuit produces an output control signal for enabling and disabling the charge pump logic circuitry of the on-chip voltage conversion circuitry to ensure that the output capacitor of the charge pump logic circuitry remains charged to the desired level without overcharging. The on-chip voltage conversion circuit further comprises one or more charging capacitors which are effective for pumping charge to the output capacitor during pump phases established by the clock circuitry (if a single charging capacitor is employed), or during both the pump and the charge phases (if two-phase charging capacitors are employed according to a variation of the invention). The charging capacitor (in the case of the single charging capacitor version) is charged during the charge phase established by the clock circuitry, according to the invention.

Simply stated, the arrangement of the invention includes an output capacitor repeatedly being provided with electric charge from either one or more charging capacitors operating in alternating charge and pump cycles to maintain a desired output voltage level. If the voltage level at the output capacitor exceeds the desired output voltage level, the various capacitors are permitted to discharge, until the output voltage level reaches the actually desired output level of voltage regulation. By inclusion of a second charging capacitor to provide complete full-phase charging action, the output capacitor enjoys the contributory effect of an almost continuous charging capability, during both charge and pump phases, albeit only by one of the charging capacitors at any given time.

DETAILED DESCRIPTION OF THE BEST MODE AND PREFERRED EMBODIMENT OF THE INVENTION

Figure 1:
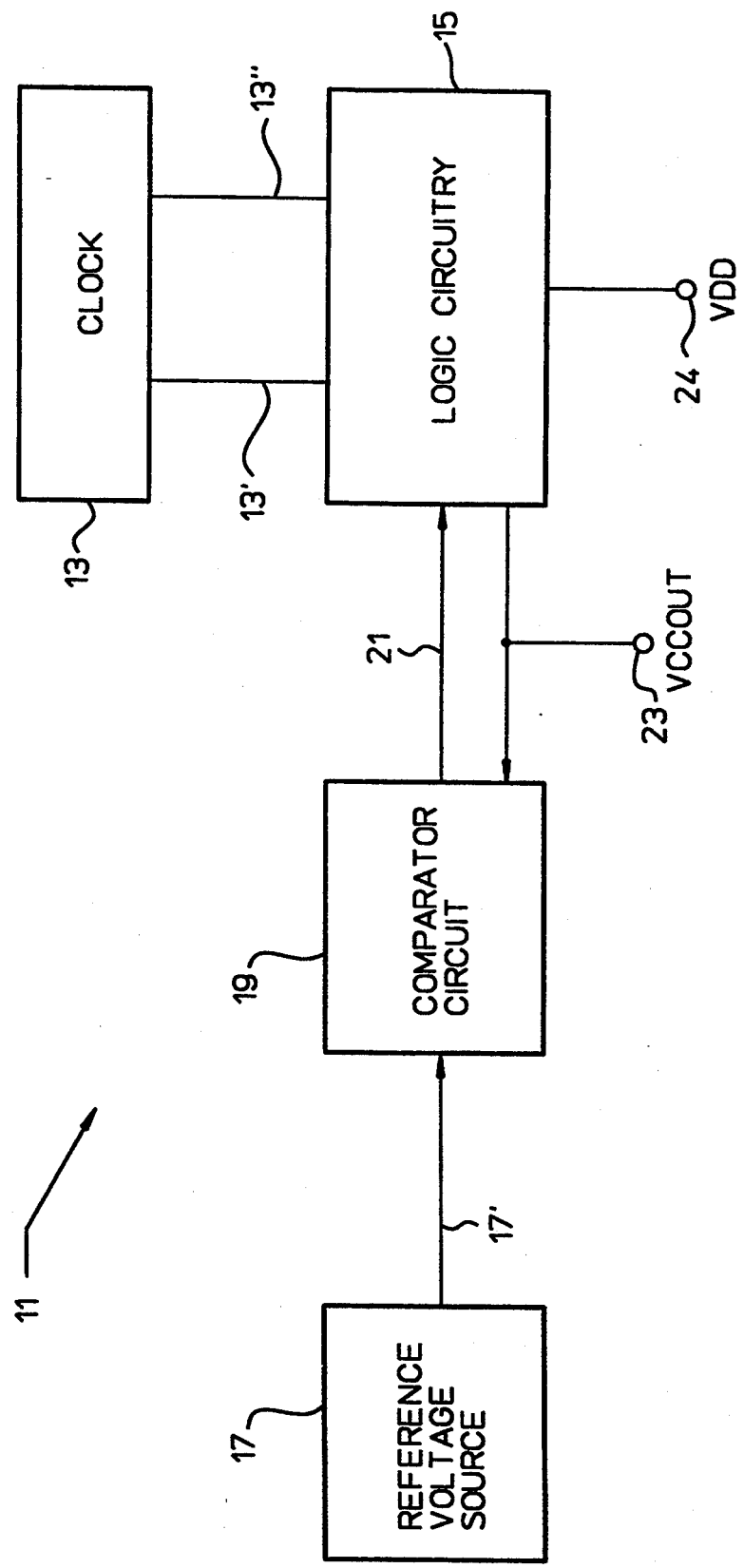
FIG. 1 is a block diagram of the overall scheme of the on-chip voltage conversion circuit arrangement according to the invention herein.

FIG. 1 shows an on-chip voltage converter circuit arrangement 11 according to the invention herein. Voltage converter circuit arrangement 11 includes a dual-phase clock pulse circuit 13 effective for generating first and second, substantially mutually-exclusive, non-overlapping clock pulses, according to respective charge and pump phases of the clock pulse circuit 13. The respective first and second clock pulses are produced on respective charge pulse and pump pulse electric signal lines, 13' and 13", preferably as positive square-wave pulses. For convenience, the particular pulses produced shall be referred to respectively as charge pulse clock pulses and pump pulse clock pulses. On-chip voltage converter circuit arrangement 11 further includes charge pump logic circuitry 15, a reference voltage source circuit 17, and a comparator circuit 19 connected electrically to reference voltage source 17 and to charge pulse logic circuitry 15, as shown in FIG. 1 and as will be discussed in detail below.

The charge pulse and the pump pulse clock pulses (or simply, the charge and pump pulses) from clock circuitry 13 are effective for driving the charge pump logic circuitry 15 of on-chip voltage converter circuit arrangement 11 and for converting on-chip or input electric power at a first voltage level to output power at a second, selected voltage level which is needed for operation of other circuitry on the chip which, for convenience, is not shown. The details of operation of the dual-phase clock pulse circuit 13 which produces alternating electric charge and pump pulses, are explained below by reference to FIG. 5 below. As will be seen, the pulses are complementary. In other words, when one of the pulses is in an "on" state, the other will be in an "off" state. As suggested above, the on-chip voltage converter circuit arrangement 11 of FIG. 1 includes reference voltage source circuit 17 and comparator circuit 19 for comparing the current level of voltage at the output of voltage converter circuit arrangement 11 to a reference voltage level provided by reference voltage source 17 at reference voltage line 17'. The reference voltage source 17 is preferably constructed as a band-gap reference generator, as would be appreciated by one skilled in the art. For convenience of representation, the reference voltage can be understood to have been provided by a voltage divider resistor ladder made up of first and second resistors (not shown) which are connected to each other at a central node (not shown), anti on opposite ends of the combination thereof to ground on one side and to the input voltage level VDD on the other. The central node between the two resistors of the voltage divider resistor ladder thereby establishes the reference voltage.

The comparator circuit 19 of the on-chip voltage converter circuit arrangement 11 shown in FIG. 1 produces an output control signal on electric control line 21 for connection to charge pump logic circuitry 15. This electric signal on electric control line 21 is effective to control the operation of charge pump logic circuitry 15 as will be discussed below with reference to FIG. 4. As will be seen, charge pump logic circuitry 15 produces an output voltage signal at output voltage line 23, referred to as VCCOUT, which is different from the voltage level VDD received by charge pump logic circuitry 15 from input voltage source 24 (i.e., VDD), according to the details of operation of charge pump logic circuitry 15 to be discussed in detail in connection with FIG. 2. Comparator circuit 19 is employed to control the operation of the charge pump logic circuitry 15, as will be seen.

Figure 2:
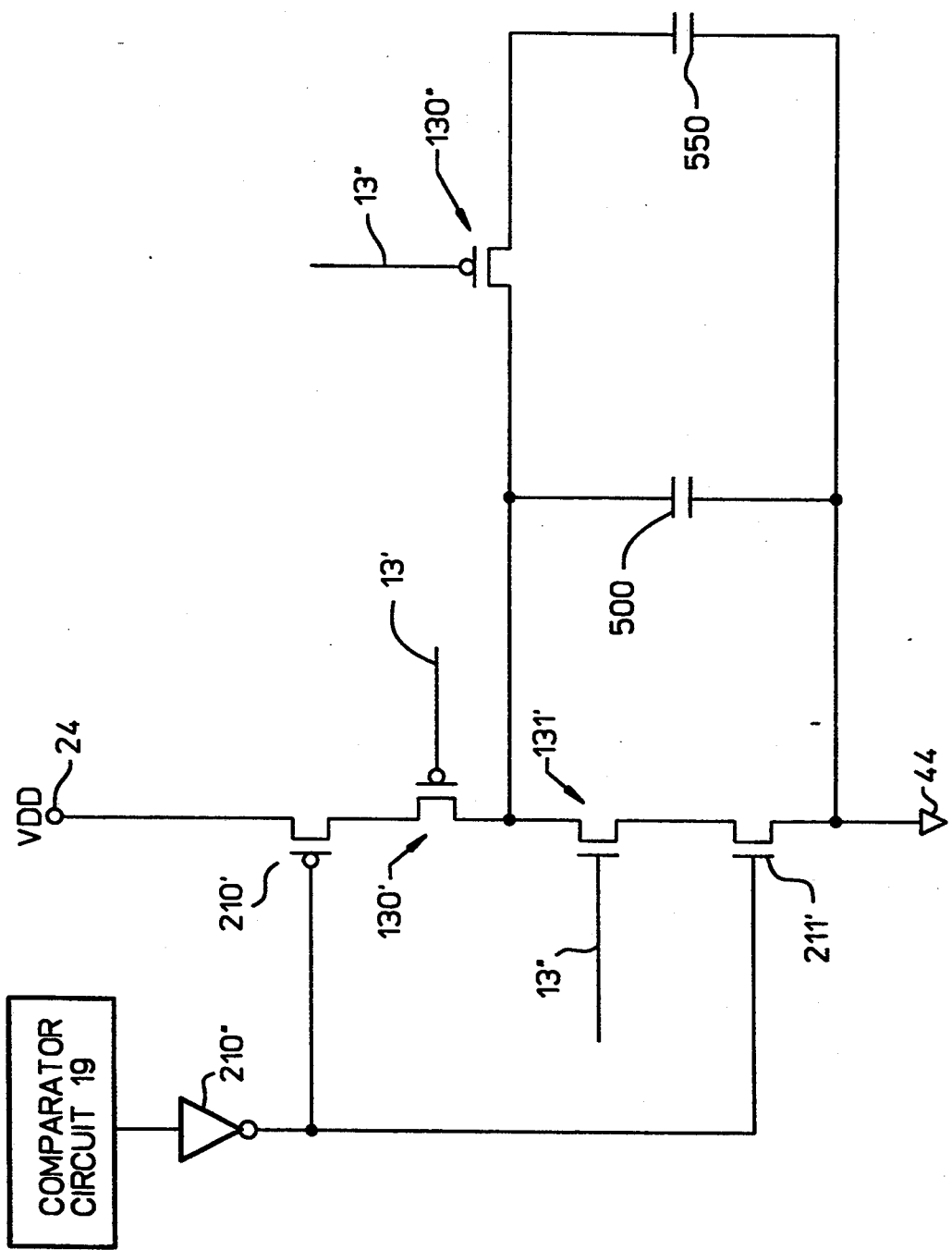
FIG. 2 is a detailed diagram of the charge pump logic circuitry portion of the on-chip voltage conversion circuit arrangement in accordance with a first version of the invention addressed herein, according to which the output or second capacitor is charged by a single charging capacitor, and charging occurs only during the charging clock phase of operation.

FIG. 2 shows the details of charge pump logic circuitry 15. In particular, charge pump logic circuitry 15 includes enabling and disabling control switching elements 210' and 211' to permit charging and pumping or the discharging operation of charge pump logic circuitry 15. Control switching elements 210' and 211' are preferably CMOS field effect transistors. Control switching elements 210' and 211' are driven at their respective inputs by control line 21 from comparator circuit 19 through an inverter 210". Inverter 210" is connected at the inputs of control switching elements 210' and 211' for inverting the logic state of the signal received from comparator circuit 19. Accordingly, control switching elements 210' and 211' receive the inverse of the electric signal produced by comparator circuit 19. Nonetheless, when control switching element 210' is open, inverse control switching element 211' will be closed, and vice versa, because of the selection of a p-channel CMOS transistor for one of the switching elements 210', 211', and an n-channel CMOS transistor for the other. FIG. 2 further shows charge pump logic circuitry 15 including charge pulse switching element 130' and pump pulse switching elements 130" and 131", each of which are preferably CMOS field effect transistors. The preferred version of the CMOS field effect transistors shown in the figures makes it clear that a mix of n-channel and p-channel CMOS transistors is required to implement the invention and to ensure that the right combination of transistors are open or closed at any particular point of circuit operations, as one skilled in the art would readily appreciate. Additionally included in charge pump logic circuitry 15 are an electric ground connection 44, and first and second capacitors respectively 500 and 550, or systems of capacitors or electric charge storage devices. Second capacitor 550 may be a separate capacitance element or representative of the output capacitance load seen at output voltage line 23. FIG. 2 shows single capacitors 500 and 550, but as would readily be appreciated, systems of capacitors, suitably connected in series or parallel, or otherwise, could be substituted. As will be seen, first capacitor 500 acts as a charging capacitor, and second capacitor 550 acts as an output capacitor for charge pump logic circuitry 15, effective for producing the voltage level desired of on-chip voltage convertor circuitry arrangement 11. According to a preferred version of the invention, capacitor 500 is set to approximately 100 picofarads, and capacitor 550 is set to approximately 1,000 picofarads. The particular capacitance values shown here are provided for illustration only. As a practical matter it is believed important only that the capacitance of capacitor 500 (and that of capacitor 700 addressed below) be approximately one order of magnitude less than the capacitance of capacitor 550. As shown, charge pulse switching element 130' is connected to and controlled by charge pulse line 13'.

Further, pump pulse switching elements 130" and 131" are each connected to pump pulse line 13" shown in FIG. 1. Accordingly, clock 13 is effective for turning charge pulse switching element 130' and pump pulse switching elements 130" and 131" on and off according to mutually exclusive charge and pump phase cycles. According to this operational scheme, charge pulse switching element 130' will be open when pump pulse switching elements 130" and 131" are closed, and vice versa.

As shown in FIG. 2, charge pulse switching element 130' is connected to the input of first capacitor 500, and pump pulse switching element 130" is connected to the input of second capacitor 550. Because charge pulse switching element 130' and pump pulse switching element 130" are alternately open and closed, and not open or closed at the same time, when first capacitor 500 is being charged, second capacitor 550 will be isolated and prevented from charging at the same time. Accordingly, provided that control line 21 permits by switching on control switching element 210', first capacitor 500 will be permitted to charge during charging periods. During such charging periods, charge pulse switching element 130' is turned on. This permits the direct application of input voltage levels from input voltage source 24 to first capacitor 500. Then, during the pump cycle, pump pulse switching element 130" will be permitted to open, allowing the charge accumulated on first capacitor 500 to be applied to second capacitor 550, i.e., output capacitor 550, and to output voltage line 23 which presents output voltage VCCOUT. FIG. 2 additionally shows the output sides of first and second capacitors 500 and 550 are respectively connected to ground connection 440, as is the output side of inverse control switching element 211'. If the signal from comparator 19 along control line 21 permits, inverse control switching element 211' will open to ground connection 440, permitting discharge or first and second capacitors 500 and 550 during pulse periods, i.e., when pump pulse switching element 131" is open as well. Such discharge of the electric charge held on the indicated capacitors 500 and 550 (and also capacitor 700, if applicable) is permitted when comparator circuit 19 senses that the output voltage level on output voltage line 23 is beyond desired level. The implementation of the invention suggested with regard to FIG. 2 only provides second capacitor 550 with pumping action during pump cycles of operation.

Figure 3:
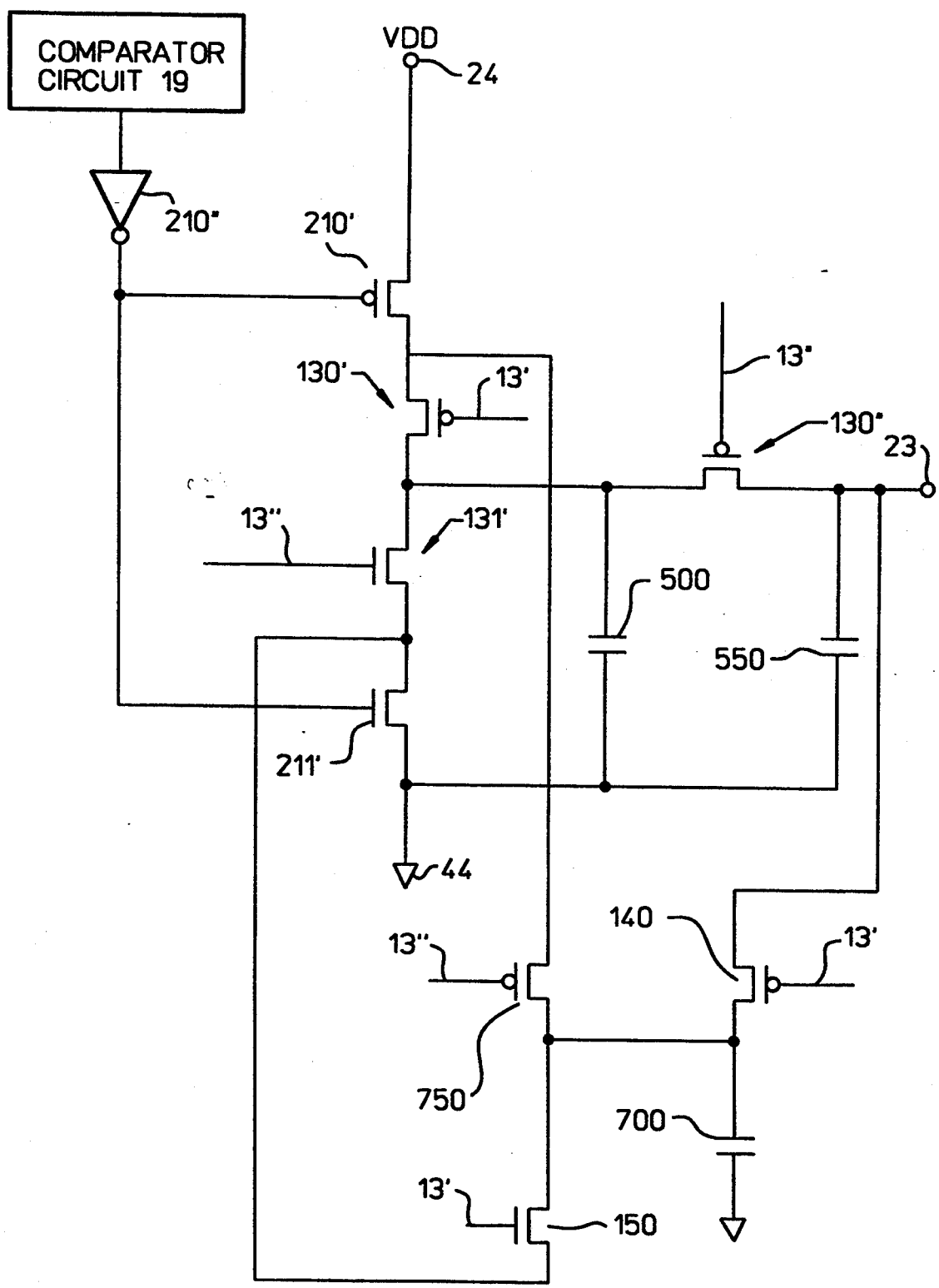
FIG. 3 is a detailed diagram of the charge pump logic circuitry of the on-chip voltage conversion circuit arrangement of the invention, including first and second charging capacitors effective for charging the output capacitor respectively during charging and pumping phases of the invention.

According to the preferred version of the charge pump logic circuitry 15 shown in FIG. 3, capacitor 550 is capable of being charged during both pump and charge cycles. FIG. 3 includes the basic arrangement of the charge pump logic circuitry 15 shown in FIG. 2 and includes additional circuit elements of the preferred version, including charge pulse switching elements respectively 140 and 150, pump pulse switching element 750, and a third capacitor 700, the latter preferably set to 100 picofarad, according to the preferred embodiment. As shown, the output of third capacitor 700 maintains output voltage line 23 at a desired output voltage level by charging action at the time when charge pulse line 13' provides a charging pulse effective for opening charge pulse switching element 140. By inclusion of third capacitor 700 to provide complete full-phase charging action, the output capacitor 550 enjoys the contributory effect of an almost continuous full-wave charging capability, during both charge and pump phases, albeit only by one of the charging capacitors 500, 700 at any given time. The input side of third capacitor 700 is provided with charge from input voltage source 24 through control switching element 210' and pump pulse switching element 750, the latter when pump pulse switching element 750 is open responsive to a pump pulse from pump pulse line 13". Third capacitor 700 is enabled to discharge, in unison with second capacitor 550, provided that charge pulse switching element 150 and charge pulse switching element 140 are provided with the needed charge pulses along charge pulse electric signal line 13', to open the indicated switching elements. Discharge of this kind is of course additionally subject to the requirement that inverse control switching element 211' providing the needed connection to ground connection 440 is in fact open.

Figure 4:
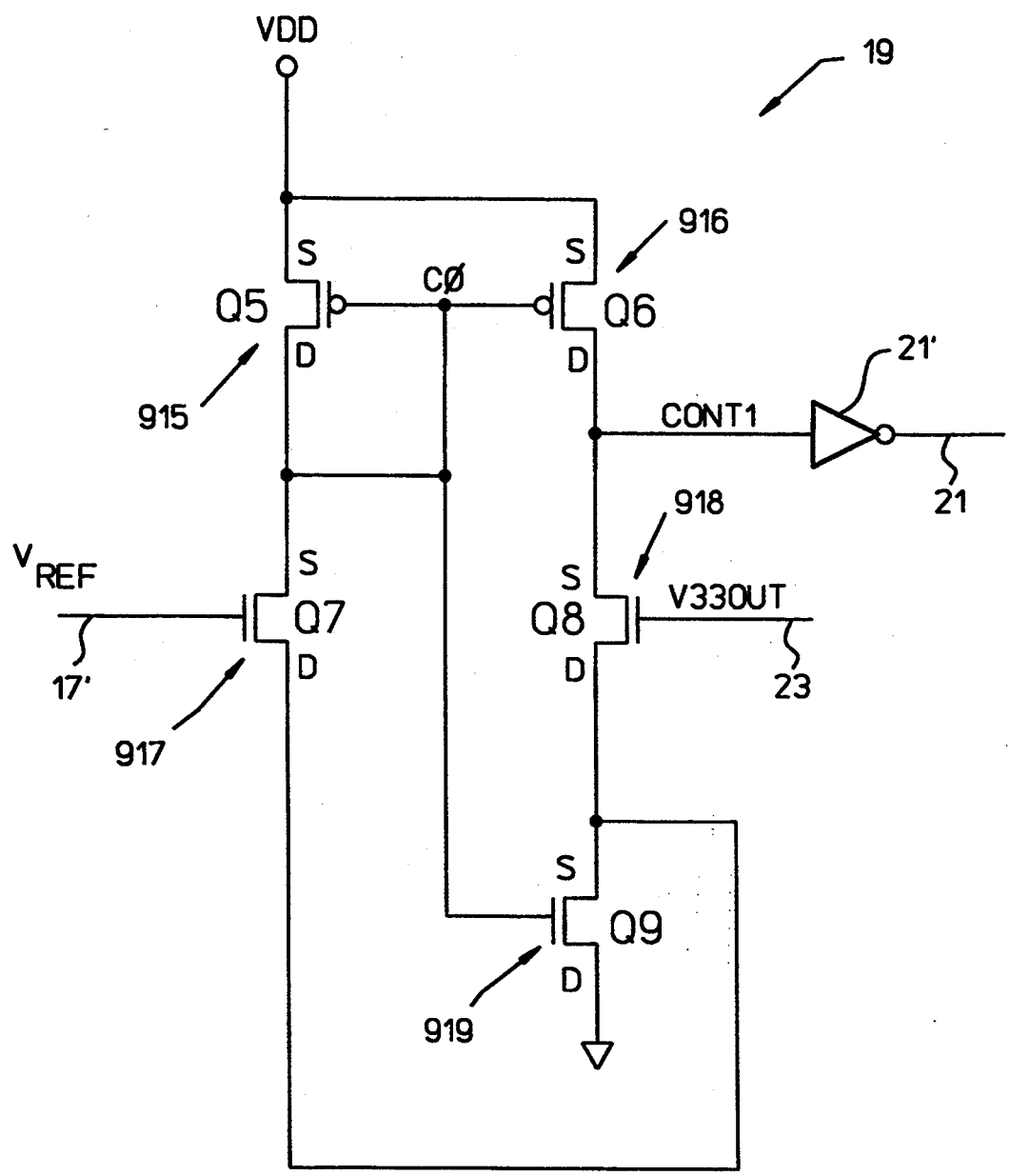
FIG. 4 is an electric circuit diagram of the comparator circuitry of the on-chip voltage conversion circuit arrangement, which is effective for monitoring the output voltage level of the charge pump logic circuitry.

In FIG. 4, the electric circuit diagram of comparator circuit 19 included with on-chip voltage converter circuit arrangement 11 is shown according to the invention herein. The preferred embodiment of the comparator circuit 19 is as a CMOS differential amplifier constructed according to techniques well known to those skilled in the semiconductor and electrical arts. FIG. 4 particular details desired features of comparator circuit 19, including in this embodiment five CMOS field effect transistors, respectively denominated as transistors Q5 thorough Q9, i.e., transistors 915–919. Transistor Q9, i.e., transistor 919, is shown connected to ground connection 440 on its drain side, and on its source side to the drains of respective field effect transistors Q7 and Q8, i.e., transistors 917 and 918. The respective bases of field effect transistors Q7 and Q8, i.e., transistors 917 and 918, are in turn connected respectively to nodes VREF and VCCOUT indicated in FIG. 4. VCCOUT is the output supply voltage of charge pump logic circuitry 15 produced on output voltage line 23. The sources of respective field effect transistors Q7 and Q8, i.e., transistors 917 and 918, are electrically connected to the drains of respective field effect transistors Q5 and Q6, i.e., transistors 915 and 916. The source sides of field effect transistors Q5 and Q6, i.e., transistors 915 and 916, are connected to voltage node VDD. Finally, the bases of respective field effect transistors Q5 and Q6, i.e. transistors 915 and 916, are connected to each other at voltage node C0 and to the base of grounding field effect transistor Q9, i.e., transistor 919. Voltage node C0 is held neither high or low and respective transistors Q9, Q5 and Q6, i.e., transistors 919, 915 and 916, are maintained in their linear operating regions. If either transistor Q7 or transistor Q8, i.e., transistors 917 or 918, receives the advantage of a higher base voltage based upon the signal received at either voltage node VREF or voltage node VCCOUT, that particular transistor will take the primary share of the current passing through field effect transistor Q9, i.e., transistor 919. Accordingly, if the voltage at node VCCOUT is below the voltage level at node VREF, voltage node CONT1 will go high, effecting an output signal to be supplied to inverter 21' which causes charging action to be enabled in charge pump logic circuitry 15.

Figure 5:
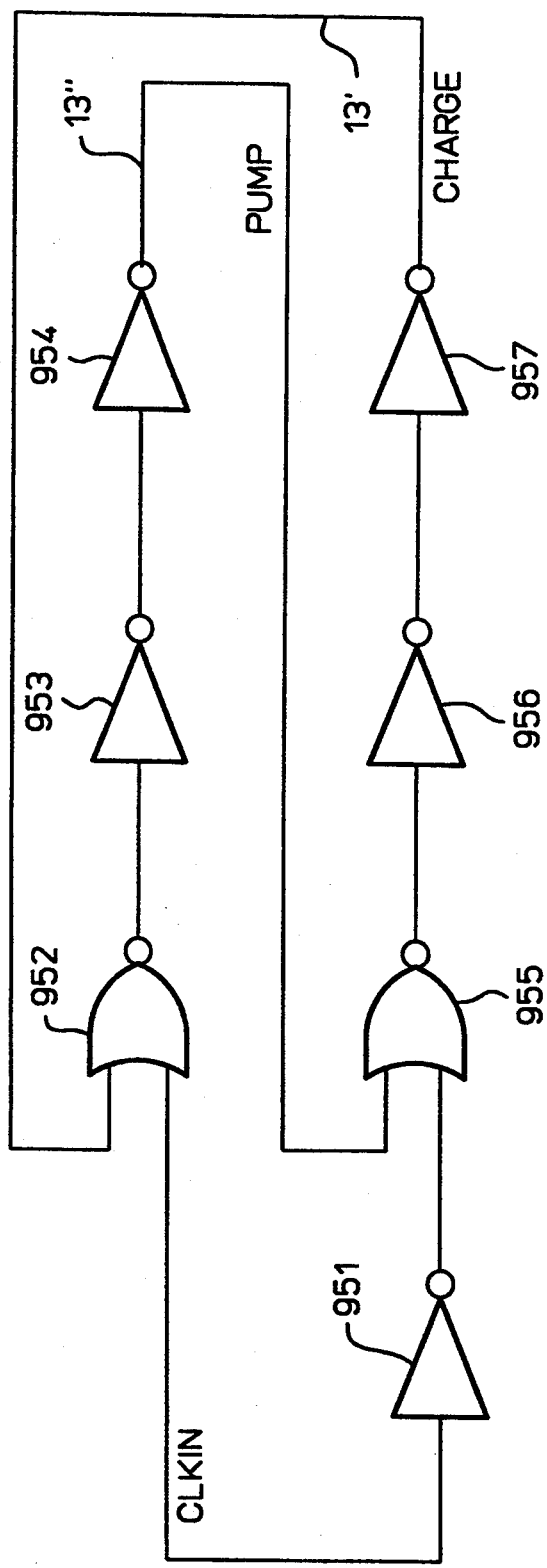
FIG. 5 is a circuit diagram of the dual-phase clock pulse circuit according to the invention which is effective for providing alternating charge and pump pulses to the charge pump logic circuitry of the on-chip voltage converter circuit arrangement according to the invention herein.

In FIG. 5, the details of a preferred version of the dual-pulse clock pulse circuit 13 effective for driving the charge pump logic circuitry 15 of the invention are shown. Dual-phase clock pulse circuit 13 includes, according to the preferred embodiment, first and second NOR gates, respectively I2 and I5, i.e., gates 952 and 955, each followed in succession by a pair of inverters, respectively I3 and I4, i.e., inverters 953 and 954, and I6 and I7, i.e., inverters 956 and 957. One of the input terminals of the second NOR gate I5, i.e., gate 955, is preceded by an inverter I1, i.e., inverter 951. Clock circuit 15 receives an input clock pulse CLKIN, which signal is directed to NOR gate I2, i.e., gate 952, as one of its inputs, and to inverter I1. i.e., inverter 951, as its only input. The input clock signal CLKIN is a simple square wave. NOR gates I2 and I5, i.e., gates 952 and 955, and their respective trailing inverters, I3 and I4, i.e., inverters 953 and 954, and I6 and I7, i.e., inverters 956 and 957, are cross-linked, with the output of inverter I4, i.e., 954, serving as an input to NOR gate I5, i.e., gate 955, and the output of inverter I7, i.e., 957, serving as an input to NOR gate I5. i.e., gate 955. Inverters I4 and I7, i.e., 954 and 957, produce mutually exclusive, out of phase clock pulses at half the period of input pulse CLKIN.

In summary, the on-chip voltage conversion circuit arrangement 11 employs alternating, mutually exclusive charge and pump pulses to drive charge pump logic circuit 15 to convert power used by the chip from a first voltage level to a selected second voltage level. The on-chip voltage conversion circuit arrangement 11 includes a comparator circuit 19 for comparing a selected reference voltage with the desired output voltage produced. The comparator circuit 19 produces a control signal for enabling or disabling the charge pump logic circuitry 15 to ensure that the output capacitor 550 of the charge pump logic circuitry 15 remains charged to the desired level without overcharging. The on-chip voltage conversion circuit arrangement 11 particularly may comprise two charging capacitors 500 and 700 and an output capacitor 550 effective for producing the desired output voltage level. One of the charging capacitors 500 and 700 provides electric charge to the output capacitor 550 with registration of each pump and each charge pulse, provided that charging operation is enabled by comparator circuit 19. Respective capacitors 500, 550, and 700 are discharged upon detection of an overvoltage condition by comparator circuit 19, thereby ensuring appropriate regulation of the output voltage level at the specific level desired. The smoothness of the output voltage signal depends upon the particular load capacitance applied to output voltage line 23.

The information above details a preferred embodiment and best mode for carrying out the invention. The invention itself, in terms of its metes and bounds, is set forth in the claims which follow:

What is claimed is:

1. A voltage level conversion circuit for an integrated circuit, comprising:
   clock means for producing complementary, alternating charge and pump pulses, such that when one of the pulses is in an on state, the other pulse is in an off state;
   charge pump logic means for receiving said alternating charge and pump pulses and an input voltage signal, said charge pump logic means being effective for producing an output voltage at a predetermined voltage level in response to receipt of said alternating charge and pump pulses and said input voltage signal, said charge pump logic means including a first charge storage system, including a charging capacitor which is effective for producing a selected output voltage level, and a second charge storage system, including an output capacitor which is effective for producing a selected output voltage level, said first charge storage system being capable of charge storage action in response to said charge pulse, and said second charge storage system being capable of charge storage action in response to said pump pulse; and
   means for controlling the operation of the charge pump logic means, said means for controlling being effective for enabling and disabling charge and pump operation of said charge pump logic means.

2. The voltage conversion circuit of claim 1, wherein said means for controlling includes a comparator circuit.

3. The voltage conversion circuit according to claim 1, wherein said charging capacitor is charged under direction of a charge pulse.

4. The voltage conversion circuit according to claim 1, wherein said charging capacitor is prevented from charging when the output voltage at the output capacitor exceeds a predetermined voltage level.

5. The voltage conversion circuit according to claim 1, wherein said charge pump logic means includes a third charge storage system, said third charge storage system being capable of charge storage action in response to an electric pump pulse.

6. The voltage conversion circuit according to claim 5, wherein said third charge storage system is capable of producing a charge storage action upon said second charge storage system in response to an electric charge pulse, whereby said second charge storage system is capable of full-wave charging action during both charge and pump phases of operation.

7. The voltage conversion circuit according to claim 5, wherein the capacitance of said third charge storage system is approximately one order of magnitude less than the capacitance of said second charge storage system.

8. The voltage conversion circuit according to claim 1, wherein the capacitance of said first charge storage system is approximately one order of magnitude less than the capacitance of said second charge storage system.

* * * * *